US006789783B2

(12) United States Patent
Boecking

(10) Patent No.: US 6,789,783 B2
(45) Date of Patent: Sep. 14, 2004

(54) FUEL INJECTION VALVE FOR INTERNAL COMBUSTION ENGINES

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/323,797

(22) Filed: Dec. 20, 2002

(65) Prior Publication Data

US 2003/0132413 A1 Jul. 17, 2003

(30) Foreign Application Priority Data

Dec. 22, 2001 (DE) ........................................ 101 63 908

(51) Int. Cl.$^{7}$ ................................................ F16K 51/00
(52) U.S. Cl. .................................... 251/333; 239/585.5
(58) Field of Search ........................... 251/129.15, 333; 239/585.1, 585.4, 585.5, 533.2

(56) References Cited

U.S. PATENT DOCUMENTS 2,822,789 A * 2/1958 Philips et al. ............... 251/333
4,819,871 A * 4/1989 Kronberger et al. ..... 239/533.3
4,982,901 A * 1/1991 Holzgrefe .............. 239/533.12
5,875,973 A * 3/1999 Filiz et al. ............... 239/533.2
6,247,655 B1 * 6/2001 Filiz et al. ............. 251/129.15
6,565,017 B1 * 5/2003 Fath et al. ............... 239/533.3

FOREIGN PATENT DOCUMENTS

DE 199 42 370 A1 * 3/2001

* cited by examiner

*Primary Examiner*—John Bastianelli
(74) *Attorney, Agent, or Firm*—Ronald E. Greigg

(57) ABSTRACT

A fuel injection valve contains a piston-shaped valve needle for closing at least one injection opening at the combustion chamber end of the bore. A conical valve seat at the combustion chamber end of the bore is contacted in the closed position of the valve needle by a valve sealing surface on the of valve needle in order to seal the at least one injection opening. The valve sealing surface includes a first conical surface and a second conical surface and the valve seat contains a first annular groove, which extends in a radial plane of the valve bore, and a second annular groove, which is disposed downstream of and parallel to this first annular groove.

12 Claims, 3 Drawing Sheets

FUEL INJECTION VALVE FOR INTERNAL COMBUSTION ENGINES

BACKGROUND OF THE INVENTION

1. Field of the Invention

The invention is directed to an improved fuel injection valve for internal combustion engines.

2. Description of the Prior Art

A fuel injection valve of the type with which this invention is concerned is known from the reference DE 199 42 370 A1. In this fuel injection valve, a valve needle is disposed so that it can move longitudinally in the bore of a valve body; a pressure chamber, which can be filled with highly pressurized fuel, is embodied between the wall of the bore and the valve needle. A number of injection openings are embodied in the valve body at the combustion chamber end of the bore and connect the bore to the combustion chamber of the engine. A conical valve seat is also embodied at the end oriented at the combustion chamber and a valve sealing surface of the valve needle comes into contact with this conical valve seat when the valve needle is in the closed position. In the closed position of the valve needle, the fuel cannot flow from the pressure chamber to the injection openings. When the valve needle lifts away from the valve seat, fuel flows out of the pressure chamber, between the valve sealing surface and a valve seat, to the injection openings, and from there, is injected into the combustion chamber of the engine.

In order to achieve a reliable seal against the valve seat, the valve sealing surface has two conical surfaces; the first conical surface is disposed upstream of the second conical surface and the two conical surfaces adjoin each other directly. The opening angle of the first conical surface here is smaller than the opening angle of the valve seat, which is in turn smaller than the opening angle of the second conical surface. As a result, at the transition of the two conical surfaces, an annular edge is produced, which comes to rest against the valve seat in the closed position of the valve needle and produces a favorably tight seal due to the relatively high surface pressure.

The hydraulic pressure acting on parts of the valve sealing surface moves the valve needle in the bore counter to a closing force directed toward the valve seat. The pressure at which the valve needle just begins to lift up from the valve seat is referred to as the opening pressure. This opening pressure depends on hydraulically effective seat diameter of the valve needle against the valve seat, which with the above-described geometry, corresponds to the diameter of the sealing edge. However, this is only true as long as no deformations of the valve needle and valve seat occur. During operation, the valve needle always deforms the valve sealing surface elastically and, particularly after extended operation, deforms the valve sealing surface plastically. As a result, the hydraulically effective seat diameter of the valve needle can change over time and therefore so can the opening pressure. In order to counteract this, the reference DE 196 34 933 A1 has disclosed providing an annular groove in the valve needle between the two conical surfaces of the valve sealing surface. However, this has the disadvantage of reducing the rigidity of the valve needle, which can lead to a deformation of the valve needle in the vicinity of the annular groove. This would jeopardize the functional performance of the entire fuel injection valve.

OBJECT AND SUMMARY OF THE INVENTION

The fuel injection valve according to the invention has the advantage over the prior art of maintaining the hydraulically effective diameter of the valve needle against the valve seat over the entire service life without reducing the rigidity of the valve needle. To this end, two parallel annular grooves are provided in the valve seat, which respectively extend in radial planes in relation to the longitudinal axis of the bore. The valve needle in this case rests against the valve seat between the two annular grooves. This delimits the surface area of the valve seat against which the valve needle rests and therefore also delimits the hydraulically effective seat diameter of the valve needle.

In an advantageous embodiment of the subject of the invention, the differential angle between the first conical surface and the conical valve seat is greater than the differential angle between the second conical surface and the valve seat. This further encourages the constancy of the hydraulically effective seat diameter.

In another advantageous embodiment, the first annular groove is embodied as an end facing or wall of the bore. This permits the first annular groove to be easily produced with high precision. In this instance, it is particularly advantageous that the first annular groove remains continuously connected to the pressure chamber without further steps being required so that the fuel pressure in the pressure chamber acts on the valve sealing surface at all times.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
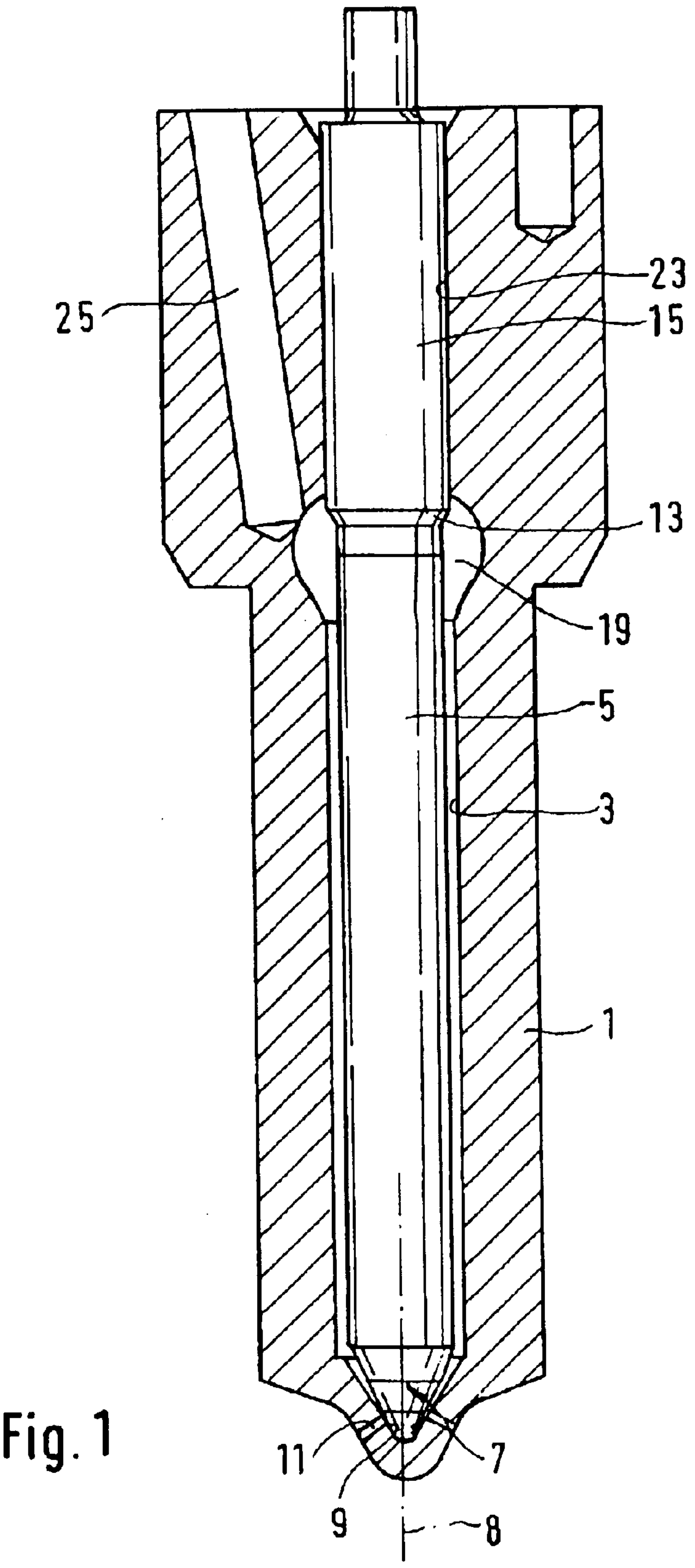
FIG. 1 shows a longitudinal section through a fuel injection valve.

FIG. 1 shows a longitudinal section through an exemplary embodiment of the fuel injection valve according to the invention. A valve body 1 contains a bore 3, which has a longitudinal axis 8 and contains a piston-shaped valve needle 5 in a longitudinally mobile fashion. At the end of the bore 3 oriented toward the combustion chamber, a conical valve seat 9 is provided, which contains at least one injection opening 11, which feeds into the combustion chamber of the engine when the fuel injection valve is installed. The valve needle 5 is guided in a sealed fashion in a guide section 23 of the bore 3 and tapers toward the combustion chamber, forming a pressure shoulder 13. At its end oriented toward the combustion chamber, the valve needle 5 transitions into a valve sealing surface 7, which rests against the valve seat 9 in the closed position of the valve needle 5. Between the valve needle 5 and the wall of the bore 3, a pressure chamber 19 is formed, which widens out radially at the level of the pressure shoulder 13. This radial widening of the pressure chamber 19 is fed by an inlet bore 25, which extends in the valve body 1 and connects a high-pressure fuel source to the pressure chamber 19, which continuously or intermittently causes a high fuel pressure to be built up in the pressure chamber 19. A device that is not shown in the drawing exerts a closing force on the valve needle 5, which acts on the valve needle 5 in the direction of the valve seat 9. As a result, the valve needle 5 is pressed with the valve sealing surface 7 against the valve seat 9 so that no fuel can travel from the pressure chamber 19 to the injection openings 11. If an injection of fuel into the combustion chamber of the engine is to take place, then the pressure in the pressure chamber 19 is increased until, when an opening pressure is achieved, the hydraulic force on the pressure shoulder 13 and on parts of the valve sealing surface 7 exceeds the closing force. The valve sealing surface 7 of the valve needle 5 then lifts up from the valve seat 9 and fuel flows out of the pressure chamber 19, between the valve sealing surface 7 and the valve seat 9, to the injection openings 11, and from there, is injected into the combustion chamber. The injection is terminated either by increasing the closing force or by interrupting the fuel supply into the pressure chamber 19. Driven by the closing force, the valve needle 5 slides back into its closed position against the valve seat 9 and thus interrupts the fuel supply to the injection openings 11.

Figure 2:
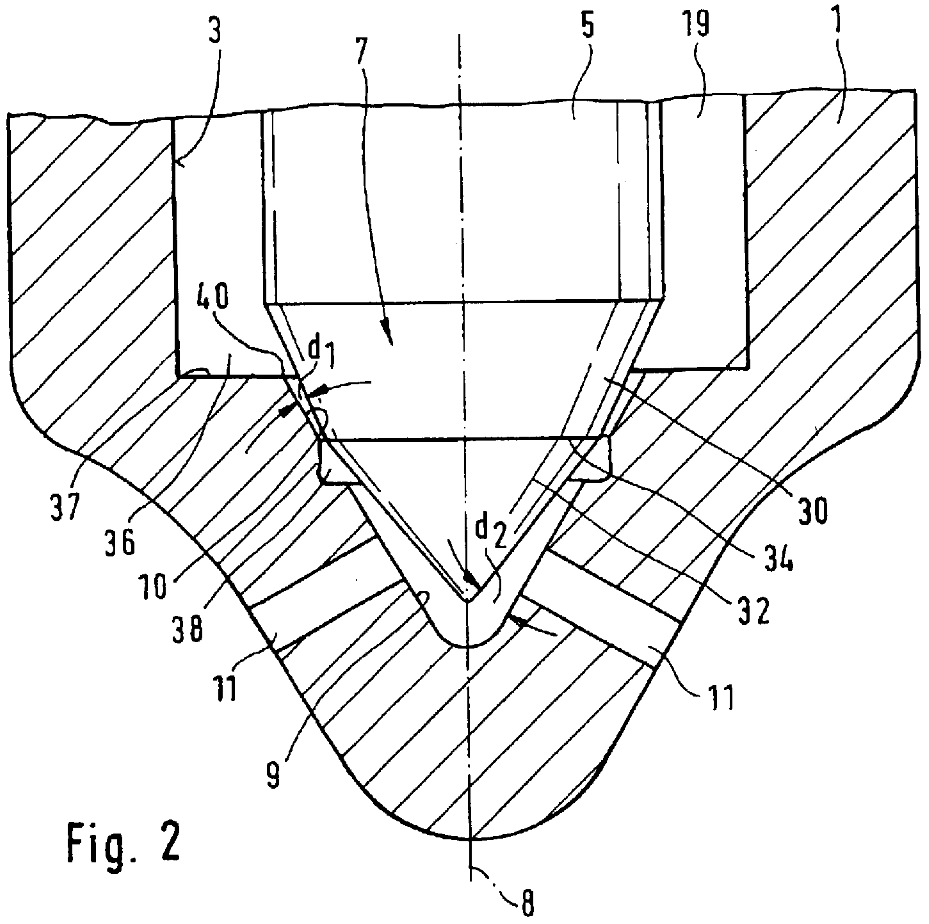
FIG. 2 shows an enlargement of FIG. 1 in the vicinity of the valve seat.

FIG. 2 shows an enlargement of FIG. 1 in the vicinity of the valve seat 9. The valve sealing surface 7 is divided into a first conical surface 30 and a second conical surface 32; an annular edge 34 is formed at the transition between the two surfaces. The opening angle of the first conical surface 30 here is smaller than the opening angle of the conical valve seat 9, which is in turn smaller than the opening angle of the second conical surface 32. The valve seat 9 contains a first annular groove 36 and a second annular groove 38 parallel to the first; the two annular grooves 36, 38 are disposed in a radial plane in relation to the longitudinal axis 8 of the bore 3. The first annular groove 36 is embodied as an end facing of the bore 3 so that this forms an annular shoulder 37. The edge 40, which is embodied at the transition of the annular shoulder 37 to the valve sealing surface 9, and the second annular groove 38 delimit the part of the valve seat 9, which serves as a contact surface 10 for the valve needle 5. In the closed position of the valve needle 5, the annular edge 34 is either disposed inside this section of the valve seat 9 or at the level of the second annular groove 38.

If the valve needle 5 and the valve body 1 were ideally rigid, then the valve needle 5 and the valve seat 9 would only touch at the annular edge 34 or at the transition of the valve seat 9 to the second annular groove 38. Because of the elastic deformations that occur, the valve needle 5 rests against the entire contact surface 10 or at least against most of it, thus correspondingly reducing the surface pressures that occur. The two annular grooves 36, 38 in any case assure that the contact surface 10 cannot increase beyond the surface area delimited by the annular grooves 36, 38. This also determines the partial surface area of the first conical surface 30, which is acted on by the fuel pressure in the pressure chamber 19, and therefore also determines the opening pressure of the valve needle 5, since in addition to the surface area of the pressure shoulder 13, the corresponding surface area of the valve sealing surface 7 also has a determining influence on the opening pressure of the valve needle 5.

The differential angle $d_1$ between the first conical surface 30 and the valve seat 9 is smaller than the differential angle $d_2$ between the second conical surface 32 and the valve seat 9, which corresponds to the so-called inverse seat angle differential. This also prevents the hammering of the annular edge 34 into the valve seat 9 from changing the surface area hydraulically acted on by the fuel in the pressure chamber 19 and thus changing the opening pressure.

Figure 3:
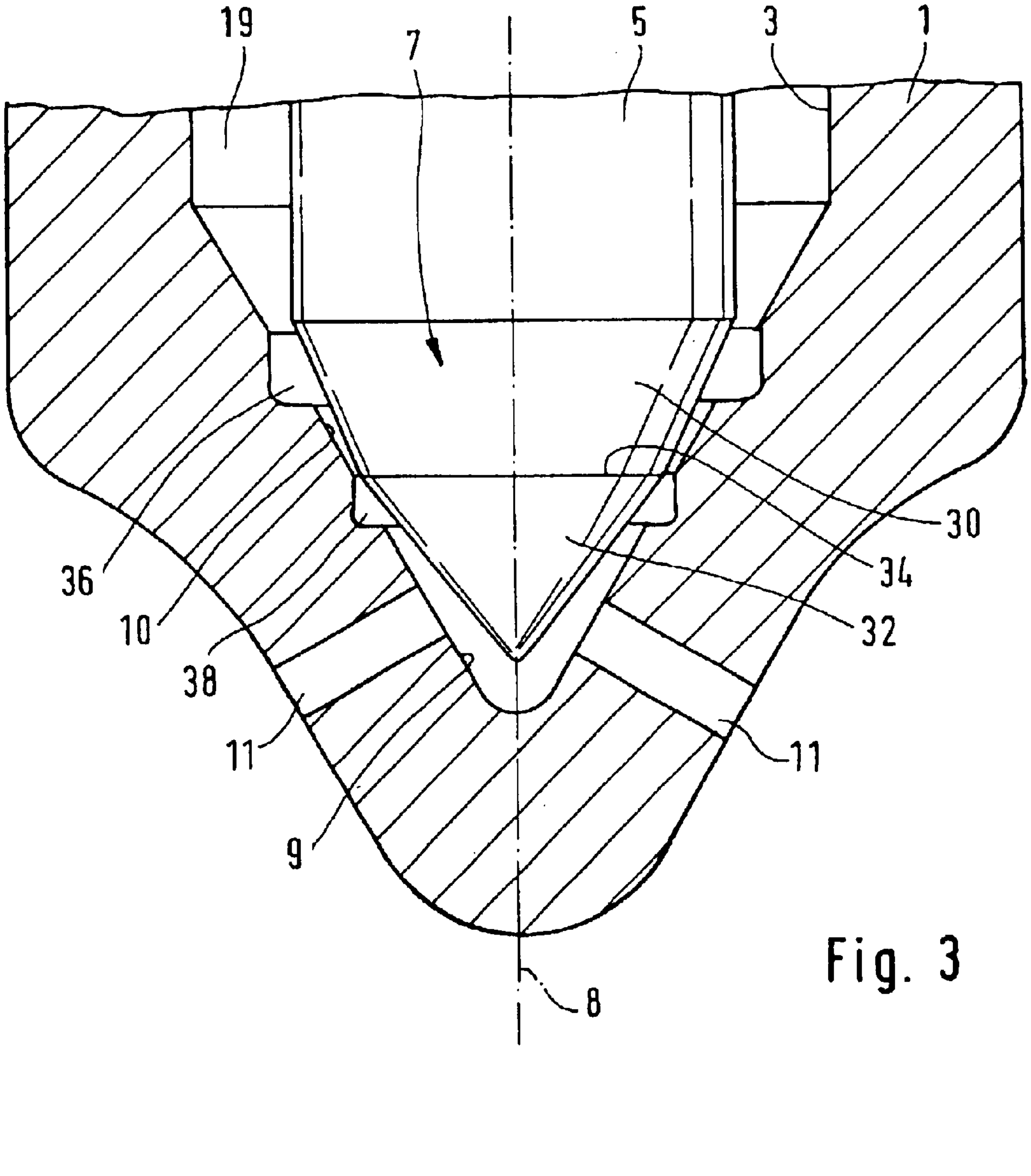
FIG. 3 shows the same detail as FIG. 2 of a different exemplary embodiment.

FIG. 3 shows an additional exemplary embodiment and shows the same detail as in FIG. 2. In this instance, the valve seat 9 extends out to the wall of the bore 3. The first annular groove 36 is embodied in the same way as a second annular groove 38, but it has a greater depth and encompasses a larger area of the valve seat 9. The contact surface 10 is once again delimited by the two annular grooves 36, 38; the fact that the first annular groove 36 is relatively large assures that it always remains hydraulically connected to the pressure chamber 19.

The opening angle of the valve seat 9 is approximately 55° to 65°, preferably approximately 60°. The corresponding differential angles $d_1$ and $d_2$ in relation to the conical surfaces 30, 32 of the valve sealing surface 7 are only a few degrees, for example 0.5° to 3°.

The foregoing relates to preferred exemplary embodiments of the invention, it being understood that other variants and embodiments thereof are possible within the spirit and scope of the invention, the latter being defined by the appended claims.

I claim:

1. A fuel injection valve for internal combustion engines, the injection valve comprising

- a valve body (1) with a bore (3) that contains a piston-shaped valve needle (5) in a longitudinally mobile fashion,
- a pressure chamber (19), which can be filled with fuel formed between the valve needle (5) and the wall of the bore (3),
- at least one injection opening (11) embodied at the combustion chamber end of the bore (3), whereby fuel can flow from pressure chamber (19) to the at least one injection opening (11)
- a conical valve seat (9), which is embodied at the combustion chamber end of the bore (3) and which cooperates with a valve sealing surface (7) embodied on the combustion chamber end of the valve needle (5) in order to control the at least one injection opening (11),
- a first conical surface (30) and a second conical surface (32) are embodied on the valve sealing surface,
- the first conical surface (30) having an opening angle that is smaller than the opening angle of the valve seat (9), which in turn is smaller than the opening angle of the second conical surface (32),
- an annular edge (34) embodied between the two conical surfaces (30; 32), and a first annular groove (36), on the valve seat (9) which annular groove extends in a radial plane of the bore (3), and
- a second annular groove (38), on the valve seat (9) which is disposed downstream of and parallel to the first annular groove (36).

2. The fuel injection valve according to claim 1, wherein the annular edge (34) lies inside the second annular groove (38) when the valve needle (5) is in the closed position.

3. The fuel injection valve according to claim 1, wherein the differential angle ($d_2$) of the second conical surface (32) between the conical valve seat (9) is greater than the differential angle ($d_1$) between the first conical surface (30) and the valve seat (9).

4. The fuel injection valve according to claim 1, wherein the first annular groove (36) is embodied as an end facing of the bore (3).

5. The fuel injection valve according to claim 1, wherein the opening angle of the conical valve seat (9) is at least approximately 60°.

6. The fuel injection valve according to claim 1, wherein the injection openings (11) open out into the valve seat (9) downstream of the second annular groove (38).

7. The fuel injection valve according to claim 1, wherein the first annular groove (36) is always hydraulically connected to the pressure chamber (19).

8. The fuel injection valve according to claim 2, wherein the first annular groove (36) is always hydraulically connected to the pressure chamber (19).

9. The fuel injection valve according to claim 3, wherein the first annular groove (36) is always hydraulically connected to the pressure chamber (19).

10. The fuel injection valve according to claim 4, wherein the first annular groove (36) is always hydraulically connected to the pressure chamber (19).

11. The fuel injection valve according to claim 5, wherein the first annular groove (36) is always hydraulically connected to the pressure chamber (19).

12. The fuel injection valve according to claim 6, wherein the first annular groove (36) is always hydraulically connected to the pressure chamber (19).

* * * * *